United States Patent [19]

McCoy et al.

[11] 4,405,015
[45] Sep. 20, 1983

[54] DEMULSIFICATION OF BITUMEN EMULSIONS

[75] Inventors: David R. McCoy; Edward E. McEntire; Robert M. Gipson, all of Austin, Tex.

[73] Assignee: Texaco Inc., White Plains, N.Y.

[21] Appl. No.: 326,461

[22] Filed: Dec. 2, 1981

[51] Int. Cl.$^3$ .............. E21B 43/24; E21B 43/40
[52] U.S. Cl. .................. 166/267; 166/303; 208/188; 210/708; 252/344
[58] Field of Search .......... 252/331, 341, 344, 358; 208/188, 11 LE, 11 R; 210/708; 166/266, 267, 272, 303

[56] References Cited

U.S. PATENT DOCUMENTS

| | | | |
|---|---|---|---|
| 3,108,059 | 10/1963 | Greenwald | 210/708 X |
| 3,267,998 | 8/1966 | Simpson | 208/11 LE |
| 3,316,181 | 4/1967 | Sackis | 252/344 |
| 3,487,003 | 12/1969 | Baillie et al. | 210/724 X |
| 3,509,047 | 4/1970 | Rushton | 210/734 |
| 3,956,117 | 5/1976 | Bradley et al. | 210/708 |
| 4,019,578 | 4/1977 | Terry | 166/267 |
| 4,101,172 | 7/1978 | Rabbitts | 166/272 X |
| 4,127,170 | 11/1978 | Redford | 166/272 X |
| 4,141,854 | 2/1979 | Pavillus et al. | 252/344 X |
| 4,238,330 | 12/1980 | Fong et al. | 252/344 X |

OTHER PUBLICATIONS

Luthy et al., "Surface Properties of Petroleum Waste Oil Emulsions", *Environmental Science and Technology,* vol. 11, No. 13, Dec. 1977, pp. 1211–1217.

*Primary Examiner*—Stephen J. Novosad
*Assistant Examiner*—George A. Suchfield
*Attorney, Agent, or Firm*—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are salts of polymers and/or co-polymers of specific cationic monomers. To resolve the bituminous petroleum emulsions, the process is carried out between 25° and 160° C. wherein the demulsifier of the invention is contacted with the bituminous emulsion.

10 Claims, No Drawings

DEMULSIFICATION OF BITUMEN EMULSIONS

BACKGROUND OF THE INVENTION

1. Field of the Invention

This invention is concerned with the breaking or resolution of oil-in-water (O/W) bituminous emulsions by treatment with salts of polymers and/or co-polymers.

2. Description of the Prior Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semi-solid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most *liquid* petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The uniqueness of these O/W bitumen emulsions is described in C. W. W. Gewers, *J. Canad. Petrol. Tech.*, 7(2), 85–90 (1968). (Prior art Reference A.) There is much prior art concerning the resolution of normal W/O emulsions. Some of the art even mistakenly equates bitumen O/W emulsions with these W/O emulsions. The following is a list of several art references.

B. U.S. Pat. No. 4,238,230 discloses the breaking of an O/W emulsion by adding to the emulsion a cationic polyacrylamide. This patent discloses and claims using polymers and co-polymers of monomers disclosed herein but not neutralized to make the salt. Our invention makes clear that in order to break bitumen emulsions which are not addressed in the patent the polymers and co-polymers of the cationic polyacrylamides must be converted to the salt form, and in the case of co-polymers comprise the majority of the polymer. The patent only breaks conventional O/W emulsions (not bitumen emulsions) and uses the polymers without conversion to salt forms. Also, the patent discloses that as the percentage of the cationic polyacrylamide portion of the co-polymer declines, the effectiveness of the demulsification increases. Surprisingly, we have found that the cationic polyacrylamides, whether in homopolymer or co-polymer form, must be neutralized to the salt form before they are effective on bitumen emulsions and must be the majority component in any co-polymer in order to be effective bitumen emulsion breakers.

C. U.S. Pat. Nos. 4,141,854 and 4,154,698 disclose the cationic polyacrylamides encompassed by our invention as co-polymers wherein the cationic polyacrylamides comprise less than 50% of the copolymer and are not in the salt form to break standard (not bitumen) W/O or O/W emulsions. We have found that these emulsion breakers are ineffective in breaking bitumen emulsions.

D. U.S. Pat. No. 3,316,181 discloses the use of diallyl dimethylamine co-polymers for breaking O/W emulsions.

E. U.S. Pat. No. 3,171,805 discloses flocculating solids from sewage containing anionic surfactants by using homo- or co-polymers of cationic polyacrylamides.

F. U.S. Pat. No. 3,487,003 discloses separating middlings from tar sand mining streams by treating with a flocculant which includes cationic polyacrylamides.

We have found that the use of particular co-polymers or homopolymers of certain cationic polyacrylamides, when used in the acid form and when comprising the majority of any co-polymer, are effective in breaking bitumen emulsions.

SUMMARY OF THE INVENTION

The invention is a method for recovering petroleum from oil-in-water bitumen emulsions by resolving or breaking these emulsions by contacting the emulsions at a temperature of between 25° and 160° C. with salts of polymers and/or co-polymers of cationic monomers having the general structure

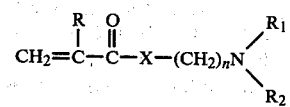

where R=H or lower alkyl, X=NH or 0, n<1, and $R_1$ and $R_2$ are hydrogen or alkyl. The polymers or co-polymers must have a molecular weight greater than about 2,000. Also, the above monomer is present in any co-polymer in greater than 50 wt.% of the total co-polymer composition.

The invention also includes the optional step of converting the salts of the polymers or co-polymers into inactive polymers or co-polymers by pH adjustment of the aqueous phase of the broken emulsion and reinjection of the aqueous phase into a hydrocarbon containing formation to recover additional hydrocarbons or bitumen.

DESCRIPTION OF THE PREFERRED EMBODIMENTS

Especially useful and preferred in this process are salts of polymers and/or co-polymers of cationic monomers represented by the general structure

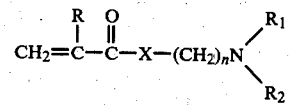

where R=H or lower alkyl, preferably $CH_3$, X=NH or 0, n>1, preferably 2 to 3, and $R_1$ and $R_2$=hydrogen or alkyl, preferably $CH_3$. In order to be effective, the polymer or co-polymer must have a molecular weight greater than about 2,000 and be in the salt form. Any copolymer must have the above monomer present in greater than 50 wt.% of the total co-polymer composition, preferably greater than 80 wt.%. The salt is formed by the addition of enough inorganic or organic acid to the polymers to render a 1 weight percent aqueous solution to a pH of less than 8 and preferably less than 7.

In one embodiment of this invention the monomers of the general structure given above are formed into homopolymers. In another embodiment of this invention the monomers of the structure above are combined with acrylamide, styrene, (meth)acrylate esters, vinyl acetate, vinyl chloride, vinyl pyrollidine, etc. to form co-polymers wherein the monomer of the structure given above is present in amounts greater than 50 wt.% of the total co-polymer composition, and preferably greater than 80 wt.% of the total co-polymer composition.

The demulsifiers of the present invention are found to cause complete, clean breaks of bitumen O/W emulsions at advantageously short residence times, sometimes almost instantageously upon addition of the demulsifier as described above.

U.S. Pat. No. 4,154,698 teaches that cationic co-polymers similar to those claimed in the present invention (containing, however, only 50 wt.% or less of the amino monomer) will break O/W emulsions only after treating the emulsion with ammonia to raise the pH to 9 and inverting the emulsion with a surfactant. No such treatment was found necessary using the present process.

Reference A teaches that pH adjustments on bitumen in water emulsions in the range of 6 to 9 have no effect on emulsion stability. Addition of alkaline inorganics disclosed in U.S. Pat. No. 3,846,276 helps to break the emulsion but addition of HCl or $H_2SO_4$ has little effect on emulsion stability unless enough acid is added to the emulsion to lower the pH below 4.5. However, it was discovered that addition of acids to the amido-amino polymers of the present invention prior to chemical treatment of the emulsion had a dramatic effect on emulsion stability even though the acids were present in such small quantities that they did not appreciably lower the pH of the emulsion. U.S. Pat. No. 3,316,181 teaches the use of amido-amine polymers and their salts for breaking O/W emulsions but no mention of bitumen emulsions is made, the amino co-polymers is not of the type claimed in the present invention, and the preferred co-polymers contain only 10–40 wt.% of the amino monomer.

Homopolymers, co-polymers and salts of the type described in the present invention are disclosed in U.S. Pat. Nos. 3,171,805 and 3,487,003 as flocculants for solids but not for demulsifying purposes. In the first case, they are specifically used to treat sewage waters containing anionic surfactants, and in the second case they are used to settle effluents from tar sand mining containing from 0.5 to 2% bitumen and 35 to 55 wt.% solids. The emulsions of interest in the present invention contain in general greater than 10% bitumen and less than 2% solids. Also, in U.S. Pat. No. 3,487,003 centrifugation and pH adjustment of the effluent to greater than 9 or less than 7.5 were needed as part of the process, unlike the present invention which requires neither step (pH adjustment of bitumen emulsion after cationic polymer addition had little or no effect on emulsion stability).

There are superficial similarities between the polymer structures claimed herein and those disclosed in U.S. Pat. Nos. 3,445,441 and 3,509,047, both used for treatment of emulsions containing ~1% oil. Also, Bikales, *Water Soluble Polymers*, Plenum Press, 1973, p. 243, disclose polymers of a type shown to be ineffective as a bitumen emulsion demulsifier in our examples which follow.

The produced bitumen emulsions may be treated by the process of our invention in a conventional manner, for example, in a conventional horizontal treater operated, for example, from about 25° to 160° C. and, preferably, from about 50° to 150° C. at autogenous pressures. The concentration of the chemical demulsifier described above used in treating the bitumen in water emulsions may range from about 1 to 200 parts per million and, preferably, from about 10 to 100 parts per million with the optional addition of an organic diluent and/or inorganic salt as well as standard flocculants and mechanical or electrical means of demulsification.

Following the demulsification process, the water containing phase is available for use in recovering additional bitumen and/or petroleum. However, if the aqueous phase still contains the polymers and/or co-polymers in the salt form, great harm would result by injecting this material into a formation. Since many recovery processes include the goal of forming emulsions in situ to aid in recovery, it is necessary that the salt forms of the polymers or co-polymers of the invention first be converted into polymers or co-polymers which are not in the salt form. These materials are then inactive in demulsifying bitumen emulsions. Many times during the treatment of the recovered bitumen emulsions as described in this application, the pH is changed and the salts are converted into the polymers and/or co-polymers. However, if this natural process does not take place, it will be necessary to convert these salt forms of the polymers and co-polymers to polymers and co-polymers which are not in the salt form by pH adjustment before injecting them into a bitumen containing formation.

Therefore, another embodiment of our invention is a process for recovering bitumen from tar sand formation comprising injecting into the tar sand a fluid containing hot water and/or steam in order to emulsify the bitumen in the tar sand, recovering the emulsified bitumen, demulsifying said emulsions by adding thereto demulsifiers comprising homopolymers or co-polymers of greater than about 2,000 molecular weight of monomers having the general structure

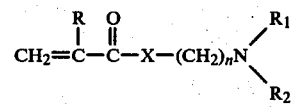

where R=H or lower alkyl, X=NH or O, n>1, $R_1$ and $R_2$ are hydrogen or alkyl wherein the homopolymer and/or co-polymer is in the salt form and monomers of the above structure comprise greater than 50% of the total co-polymer where a co-polymer is used, converting the salts of the polymers or co-polymers into inactive polymers or co-polymers by pH adjustment of the aqueous phase of the broken emulsion, and reinjecting the aqueous phase into a bitumen containing formation to recover additional bitumen.

The following examples describe more fully the present process. However, these examples are given for illustration and are not intended to limit the invention.

EXAMPLE I

To a one liter resin kettle were charged 247 g DMAPMA*, 250 g isopropanol and 1.0 cc of a solution of 17.9%, 2,2'-azobis(2,4-dimethylvaleronitrile) in toluene. The resulting solution was deoxygenated for 65 minutes by bubbling nitrogen through at a rate of 14 liters/hour. The nitrogen padded solution was then heated first to 45° C., then the temperature was elevated to 88° C. over 2.5 hours. After 0.5 hour of heating, 3.5 cc of the initiator solution was added; after 1.0 hour of heating, 5.0 cc was added; and after 1.5 hour, 5.0 cc more was added for a total of 14.5 cc initiator solution.
*DMAPMA=dimethylaminopropylmethacrylamide,

$$(CH_3)_2NCH_2CH_2CH_2NHC(=O)-C(CH_3)=CH_2$$

The resulting solution (270 g) was evaporated to 140 g with a pump vacuum of about 2 mm Hg and a boiling water bath. The solid residue was treated at −78° C., then chipped from the evaporation flask to provide a yellowish, glassy solid.

Molecular weight was determined by size exclusion liquid chromatography on a Toya Soda 3000 P.W. column using as a solvent 0.8 M trishydroxymethylaminomethane adjusted to pH=7. Using polyethylene glycol molecular weight standards, the weight average molecular weight of the polymer was 58,000.

EXAMPLE II

In an experiment similar to Example I, the following were charged to the reactor. 300 g DMAPMA, 500 g deionized water, 1.0 g 2,2'-azobis(2-amidinopropane)-hydrochloride, and 0.05 g sodium salicylate. Deoxygenation was accomplished by nitrogen stream for 70 minutes. The reaction mixture was heated first at 55° C. for 4.3 hours, then the temperature was increased to 80° C. and held at temperature for 6.7 hours.

Conversion of the monomer was 89% complete and a polymer resulted which had a molecular weight of about 1.5 million by size exclusion liquid chromatography using polyacrylamide standards. The solvent used was 0.1 N nitric acid; the column material was 1000 angstrom silica coated with alkyl amine groups.

EXAMPLE III

In an experiment similar to Example I, a polymer of DMAEMA* was prepared having an approximate molecular weight of 290,000 (as measured in Example II). Acetone was the polymerization solvent.
*DMAEMA=dimethylaminoethylmethacrylate

$$CH_2=C(CH_3)COCH_2CH_2N(CH_3)_2$$

EXAMPLE IV

A 50:50 co-polymer of acrylamide and DMAPMA was prepared in an experiment similar to Example III. The reactor charge was 50 g DMAPMA, 50 g acrylamide, 300 g deionized water, 100 g isopropanol, 0.5 g 2,2'-azobis(2,4-dimethylvaleronitrile) and 0.1 g ethylenediamine tetracetic acid, disodium salt. The heating time was 6 hours at 50° C. Conversion of both monomers was 98% or more. The resulting polymer (product a.) had a molecular weight of 435,000 as measured in Example II.

The Preparation of HCl salt of 80% DMAPMA:20% Acrylamide

To 46.35 g DMAPMA were added slowly 58.1 g 17.1% aqueous hydrochloric acid with external cooling to keep the contents below 30° C. Final pH was 5.0. This solution was transferred to a resin flask with 214.16 g deionized water followed by 23.18 g of 50% aqueous acrylamide, 0.11 g sodium salicylate and 0.5 g 2,2'-azobis(2-amidinopropane).HCl. The kettle and contents were nitrogen purged with mechanical stirring for one hour. Nitrogen flow through ebulator was reduced to 4.5 liter/hour and contents were held at 50° C. for 5.6 hours. Analysis of a 0.5 wt.% aqueous solution of the product showed a 25° C. kinetic viscosity of 17.4 cs and a polymer molecular weight (Mw) by liquid chromatography of 1,500,000 (product b). Bottle test data in Example XI show this copolymer to be an active demulsifier for bitumen systems and is superior to the 50:50 co-polymer described above.

EXAMPLE V

A commercial flocculant contains an acrylamide-N-(dimethylaminomethyl)acrylamide co-polymer of >200,000 molecular weight. Analyses performed on this compound indicated it to contain virtually no unsubstituted acrylamide groupings. Thus, it is apparently a homopolymer of

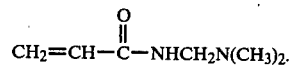

$$CH_2=CH-C(=O)-NHCH_2N(CH_3)_2.$$

Labeled product a. This material was dissolved in water containing enough hydrochloric acid to prepare a 1 weight percent polymer solution of pH 6–7. This solution of aminopolymer salt (product b) was used for subsequent demulsifier tests.

EXAMPLE VI

Salts of Product of Example I a. One gram of the solid polymer isolated from Example I was dissolved in 99 grams deionized water and enough 10% hydrochloric acid added to bring the solution pH to 6–7.

b. As in a. above, except that concentrated sulfuric acid was used to give a pH of 6.5.

c. As in a. above, except that pH=8.5.

d. As in a. above, except that pH=7.

e. As in a. above, except that pH=3.2.

EXAMPLE VII

Salt of Product of Example II

To 35.6 g of the polymer solution in Example II (previously diluted with water to 2.81 weight percent polymer content) were added 63.8 g H₂O and 1 g concentrated hydrochloric acid so as to prepare a 1 weight percent aminopolymer salt solution for demulsifier testing.

EXAMPLE VIII

Salts of Product of Example III

The acetone polymer solution of Example III was added to deionized water containing hydrochloric acid so as to prepare 1% aqueous polymer solutions having pH's of 7.5 (product a.), 6.7 (product b.) and 2.4 (product c.), respectively.

EXAMPLE IX

Salts of Product of Example IV

The aqueous isopropanol polymer solution of Example IV was added to deionized water containing hydrochloric acid so as to prepare 1% aqueous polymer solutions having pH's of 6.8 (product a.) and 2.5 (product b.), respectively.

EXAMPLE X

Product of Prior Art L

The procedure of Bikales, referred to above, was used on 50,000–100,000 molecular weight poly(ethyleneimine) to prepare a carbamoylated analog. Infrared analysis on the final product was consistent with a primary tertiary urea.

EXAMPLE XI

Demulsifier Testing

The following basic testing procedure was employed:

a. A 1 weight percent solution (on an amines charged basis where aminopolymers were used, rather than on an amines salts basis) of each chemical was prepared (in water or acetone).

b. A 30 ml PYREX ® test tube equipped with screw top was charged with 23 ml emulsion of 11.5 weight percent bitumen content obtained by in-situ steam flooding in tar sand pattern located at Ft. McMurray, Alberta, Canada.

c. 2 ml Wizard Lake crude oil was added as diluent and the contents of the test tube were mixed.

d. The contents of the test tube were equilibrated in a 80° C. oven for 1–2 hours and mixed again.

e. Chemical was added to the hot, dilute emulsion at the following concentrations: 30, 60, 120 ppm.

f. Contents of the test tubes were mixed, re-equilibrated in an oven at 80° C. for 1 hour and mixed again.

q. After 20 hours of standing at 80° C., measurements were made on the volume of top and middle layers, and the appearance of the aqueous phase was noted. Samples of some top layers were carefully removed by pipetting and subjected to Karl-Fischer analysis for determination of the water content. pH measurements were made on the aqueous phases of some broken emulsions to confirm that the addition of even highly acidic demulsifier solutions in the small quantities used have little effect on lowering the pH from the initially observed emulsion pH of 7.8.

Comparative examples XIk, r, s and y are given to show the relative ineffectiveness of prior art compounds.

Comparative examples XIa and XIb show the necessity of n being greater than 1 in the monomer specified in the claims.

The necessity of >50 weight percent amino-containing monomer in the claimed co-polymers for this invention (preferably ≧80 weight percent) is demonstrated by the borderline results obtained with the 50:50 co-polymer of Example IV and its salts (see Examples XIa' through XIf').

The desirability of reducing demulsifier pH's to below 8 prior to addition to the emulsion is fully demonstrated numerous times in these examples as is the desirable treatment concentration range (>60 ppm).

The relatively small effect of polymer molecular weight on demulsifying ability can be seen by the good results obtained on polymers of ~58,000 molecular weight (Examples I and VI) and ~1,500,000 (Examples II and VII).

Specific test results are summarized in the tables on the following pages.

Examples XIc and d represent the first successful reductions to practice of this invention.

DEMULSIFIER TESTING

| Example XI | Candidate Demulsifier | Concentration (ppm) | Oil Phase Volume in ml (% H$_2$O) | Emulsion Phase Volume in ml (% H$_2$O) | Aqueous Phase Appearance |
|---|---|---|---|---|---|
| a | Product a of Example V | 60 | 3 | 4 | Muddy |
| b | Product b of Example V | 60 | 2.5 | 5 | Muddy |
| c | Product of Example I | 60 | 3 | ~2 | Light muddy |
| d | Product of Example I | 60 | 7.5 (54.9) | 0 | Light muddy |
| e | Product of Example VII | 30 | 1 | 7.5 | Clear, colorless |
| f | Product of Example VII | 60 | 9.5 (32.1) | 0 | Muddy |
| g* | Product of Example VII | 120 | 11 (17.1) | 0 | Yellow, translucent |
| h | Product of Example VIa | 30 | 0.5 | 7 | Muddy |
| i | Product of Example VIa | 60 | 10 (51.2) | 0 | Yellow, translucent |
| j* | Product of Example VIa | 120 | 8 (2.82) | 0 | Yellow, clear |
| k | POLYOX WSR-301** | 60 | 9.5 (39.8) | 0 | Yellow, clear with chunks |
| l | Product of Example VIb | 60 | 2 | 8 | Dark, translucent |
| m* | Product of Example VIb | 120 | 6 (16.9) | 0 | Clear, colorless (pH 7.7) |
| n | Product of Example VIc | 120 | 4.5 (24.1) | 0 | Muddy |
| o* | Product of Example VId | 120 | 8 (3.2) | 0 | Clear, colorless (pH 7.6) |
| p | Product of Example VId | 60 | ~6 (21.2) | 0 | Muddy |
| q* | Product of Example VIe | 120 | 12.5 (8.22) | 0 | Clear, colorless (pH 7.35) |
| r | POLYOX WSR-301** | 60 | 9 (53.2) | 0 | Light, translucent |
| s | Product of Example X | 60 | ~4 | 2.5 | Light muddy with chunks |
| t* | Product of Example VIIIa | 120 | 6.5 (1.28) | 0 | Yellow, clear |
| u* | Product of Example VIIIb | 60 | 7.5 (40.2) | 0 | Yellow, clear |
| v* | Product of Example VIIIb | 120 | 6 (0.74) | 0 | Clear, colorless |
| w | Product of Example VIIIc | 120 | 6 (0.27) | 0 | Yellow, translucent |
| x | Product of Example III | 60 | 5 (6.25) | 0 | Muddy |
| y | POLYOX WSR-301** | 120 | 9 (41.2) | 0 | Yellow, translucent |
| z | Product of Example VId | 120 | 7.5 (3.29) | 0 | Yellow, clear |
| a' | Product of Example IVa | 60 | 2 | 6 | Muddy |
| b' | Product of Example IVa | 120 | 2.5 | 5 | Muddy |
| c' | Product of Example IXa | 60 | 5.5 (48.9) | 2 | Muddy |
| d'* | Product of Example IXa | 120 | 3 (48.9) | 4 | Yellow, clear |

-continued

| Example XI | Candidate Demulsifier | Concentration (ppm) | Oil Phase Volume in ml (% $H_2O$) | Emulsion Phase Volume in ml (% $H_2O$) | Aqueous Phase Appearance |
|---|---|---|---|---|---|
| e' | Product of Example IXb | 60 | 9 (59.5) | 0 | Muddy |
| f* | Product of Example IXb | 120 | 4 (4.61) | 4 | Yellow, clear |
| g' | Product of Example IVb | 60 | 2 | 8 | Almost translucent |
| h' | Product of Example IVb | 120 | 11.25 (6.2) | 0 | Yellow, clear |
| i' | POLYOX WSR-301** | 60 | 6.5 (67.1) | 0.75 | Brown, translucent |
| j' | POLYOX WSR-301** | 120 | 6.75 (50.1) | 0.75 | Muddy |

*Clear water layer formed immediately after adding demulsifier
**A 4,000,000 molecular weight commercial poly(ethylene oxide)
Note: Horizontal lines on left group test run on same day and same emulsion.

Examples XII–XV show the improvement over the method of U.S. Pat. No. 3,487,003.

EXAMPLE XII

The basic method of Example XI was utilized on the DMAPMA polymer of Example I at 120 ppm treating level.

EXAMPLE XIII

Example XII above was repeated with 1 g 0.02 N $H_2SO_4$ added after the oven equilibration of step f in procedure XI. This lowered the solution pH to 6.6.

EXAMPLE XIV

Repeated Example XIII using 2 g $H_2SO_4$ solution to lower pH to 5.6.

EXAMPLE XV

Used the basic method of Example XI with 120 ppm DMAPMA polymer.$H_2SO_4$ salt of Example Vb (repeat of XIm). (The method of the present invention).

| Example | Oil Phase, Vol. in ml (% $H_2O$ in oil) | Emulsion Phase, Vol. | Aqueous Phase |
|---|---|---|---|
| XII | 2.5 | 5.0 | Muddy |
| XIII | 2.5 | 5.5 | Muddy |
| XIV | 5 | 4.5 | Muddy |
| XV | 9 (27.2) | 0 | Clear, yellow |

EXAMPLE XVI

Cationic Monomer Salts

Enough sulfuric acid was added to 1% aqueous solutions of various cationic monomers (DMAPMA=dimethylaminopropylmethacrylamide; DMAEMA=dimethylaminoethylacrylate; DMAEA*=dimethylaminoethylacrylate) to render them pH 2–7. Bottle test data in the accompanying table show these monomer salts to be totally inactive as demusifiers for bitumen systems, in contrast to reported results in U.S. Pat. No. 4,238,330.
*DMAEA=dimethylaminoethylacrylate

| Example | Candidate Demulsifier | Concentration (ppm) | Oil Phase, Volume in ml. (% $H_2O$) | Emulsion Phase, Volume in ml. (% $H_2O$) | Aqueous Phase Appearance |
|---|---|---|---|---|---|
| a | DMAPMA.$H_2SO_4$ | 60 | 3 | 2.5 | Muddy |
| b | DMAPMA.$H_2SO_4$ | 120 | 1.25 | 3.5 | Muddy |
| c | None | — | 1.75 | 3.5 | Muddy |
| d | DMAEMA.$H_2SO_4$ | 120 | 2 | 5 | Muddy |
| e | DMAEA.$H_2SO_4$ | 120 | 2.5 | 5 | Muddy |
| f | None | — | 3.5 | 2 | Muddy |

We claim:

1. A process for recovering petroleum from oil-in-water bitumen emulsions by demulsifying said emulsions by adding thereto demulsifiers comprising hompolymers or co-polymers of greater than about 2,000 molecular weight of monomers having the general structure

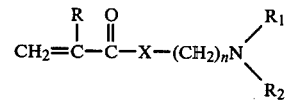

where R=H or lower alkyl, X=NH or O, n>1, $R_1$ and $R_2$ are hydrogen or alkyl wherein the homopolymer and/or co-polymer is in the salt form and monomers of the above structure comprise greater than 50% of the total co-polymer where a co-polymer is used.

2. A process as in claim 1 wherein the demulsifier is a homopolymer.

3. A process as in claim 1 wherein the demulsifier is a co-polymer.

4. A process for recovering petroleum from O/W bitumen emulsions by demulsifying said emulsions by adding thereto demulsifiers comprising homopolymers or co-polymers of greater than about 2,000 molecular weight of monomers having the general structure

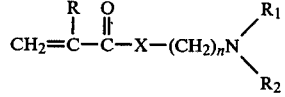

where R, $R_1$ and $R_2$ are all $CH_3$, X=NH and n=3 wherein the homopolymer and/or co-polymer is in the salt form and monomers of the above structure comprise greater than 50% of the total co-polymer where a copolymer is used.

5. A process as in claim 4 where the demulsifier is a homopolymer.

6. A process as in claim 4 wherein the demulsifier is a co-polymer.

7. A process for recovering petroleum from O/W bitumen emulsions by demulsifying said emulsions by adding thereto demulsifiers comprising homopolymers or co-polymers of greater than about 2,000 molecular weight of monomers having the general structure

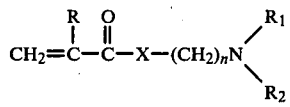

where $R_1$ and $R_2 = CH_3$, $X = O$, and $n = 1$ wherein the homopolymer and/or co-polymer is in the salt form and monomers of the above structure comprise greater than 50% of the total co-polymer where a co-polymer is used.

8. A process as in claim 7 wherein the demulsifier is a homopolymer.

9. A process as in claim 7 wherein the demulsifier is a co-polymer.

10. A process for recovering bitumen from a tar sand formation comprising injecting into the tar sand a fluid containing hot water and/or steam in order to emulsify the bitumen in the tar sand, recovering the emulsified bitumen, demulsifying said emulsions by adding thereto demulsifiers comprising homopolymers or co-polymers of greater than about 2,000 molecular weight of monomers having the general structure

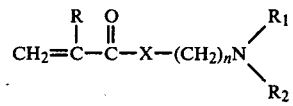

where $R = H$ or lower alkyl, $X = NH$ or $O$, $n > 1$, $R_1$ and $R_2$ are hydrogen or alkyl wherein the homopolymer and/or co-polymer is in the salt form and monomers of the above structure comprise greater than 50% of the total co-polymer where a co-polymer is used, converting the salts of the polymers or co-polymers into inactive polymers or co-polymers by pH adjustment of the aqueous phase of the broken emulsion, and reinjecting the aqueous phase into a bitumen containing formation to recover additional bitumen.

* * * * *